March 1, 1960   K. GEBELE   2,926,575
SINGLE LENS REFLEX CAMERA
Filed June 1, 1955   4 Sheets-Sheet 1

March 1, 1960 K. GEBELE 2,926,575
SINGLE LENS REFLEX CAMERA
Filed June 1, 1955 4 Sheets-Sheet 4
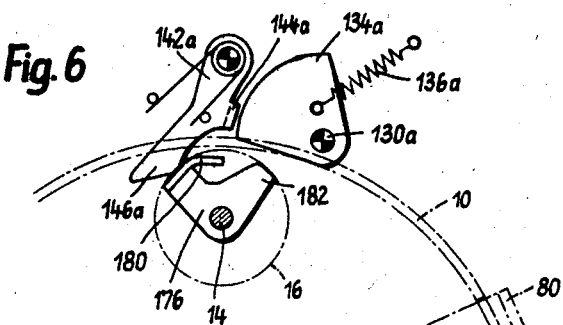
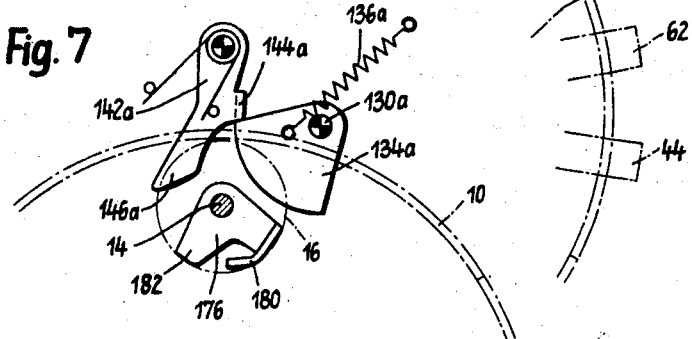
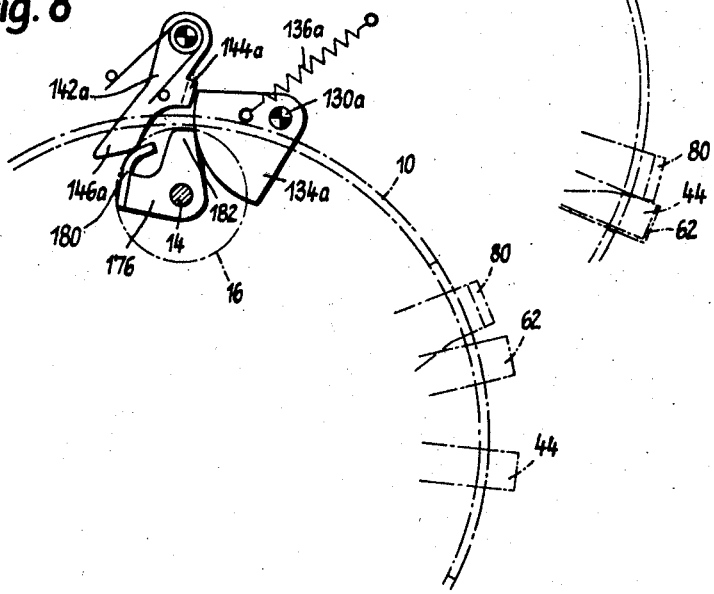

United States Patent Office 2,926,575
Patented Mar. 1, 1960

2,926,575

SINGLE LENS REFLEX CAMERA

Kurt Gebele, Munich, Germany, assignor, by mesne assignments, to Compur-Werk Friedrich Deckel OHG., Munich, Germany, a firm of Germany Application June 1, 1955, Serial No. 512,499

Claims priority, application Germany June 2, 1954

2 Claims. (Cl. 95—42)

This invention relates to a photographic camera, particularly of the single lens reflex type.

In such cameras, the swinging of the reflex mirror used during the focusing operation, to carry it out of the path of the light rays when an exposure is to be taken, is generally effected by the camera release which at the same time also controls the release of the camera shutter. In practice, such a construction has the disadvantage of requiring close and careful adjustment in order to obtain proper synchronization of the motions of the mirror and the camera shutter, so that the opening and closing of the lens aperture will take place only after the reflex mirror has been completely swung out of the way, and so that the swinging of the mirror will not begin until after the shutter blades have been completely closed from their previously open position during the focusing operation.

An object of the present invention is to provide a generally improved and more satisfactory construction which is free from the above mentioned difficulties and drawbacks.

Another object is the provision of a camera so designed and constructed that the interengaging and cooperating controls for the mirror and the shutter operation are of extremely simple and compact character, not likely to get out of order, and insuring against faulty operation.

These and other desirable objects may be attained in the manner disclosed as an illustrative embodiment of the invention in the following description and in the accompanying drawings forming a part hereof, in which:

Figs. 6–8 are somewhat diagrammatic or schematic views of another embodiment of the invention.

The same reference numerals throughout the several views indicate the same parts.

Figure 2:
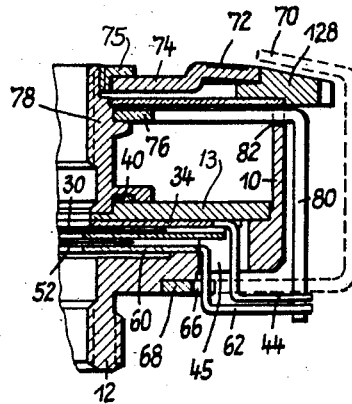
Fig. 2 is a fragmentary radial section taken through the right hand part of the shutter shown in Fig. 1.

It will be convenient first to describe the shutter itself, for an understanding of the construction and operation of the shutter will be helpful in understanding the relationship between the camera controlling and operating parts (including the mirror operating parts) and the shutter. The shutter itself forms the subject matter of applicant's copending application filed May 20, 1955, Serial No. 509,929. But for the sake of a ready understanding of the shutter with minimum need to refer to said copending application, the shutter will now be described in the present application.

Referring now to the drawings, the shutter comprises the usual casing or housing 10 of generally cylindrical annular shape, formed with a rearward tubular extension 12 threaded internally for mounting the rear component of the lens, and externally for mounting the entire shutter on the body of the camera. The casing is divided by a transverse plate or partition 13, to which is fastened the forward lens tube 78 in which is mounted the forward component of the lens. The optical axis of the shutter passes centrally through the lens tubes 12 and 78, as usual. The front of the casing is closed by a stationary cover plate 74, held in place by a retaining ring 75 screwed on the front end of the front lens tube 78. The shutter operating mechanism, partly described below, is located in the annular part of the casing in front of the partition plate 13, while the shutter blades and diaphragm leaves or blades are mounted in the casing to the rear of the partition plate 13.

A shutter cocking shaft or tensioning shaft 14 is mounted in the annular part of the casing, with its axis substantially parallel to the optical axis, and projects rearwardly out of the back of the shutter, into the associated camera body with which the shutter is used, so that this shaft may be turned by any suitable knob or crank or other mechanism mounted on the camera body.

Figure 3:
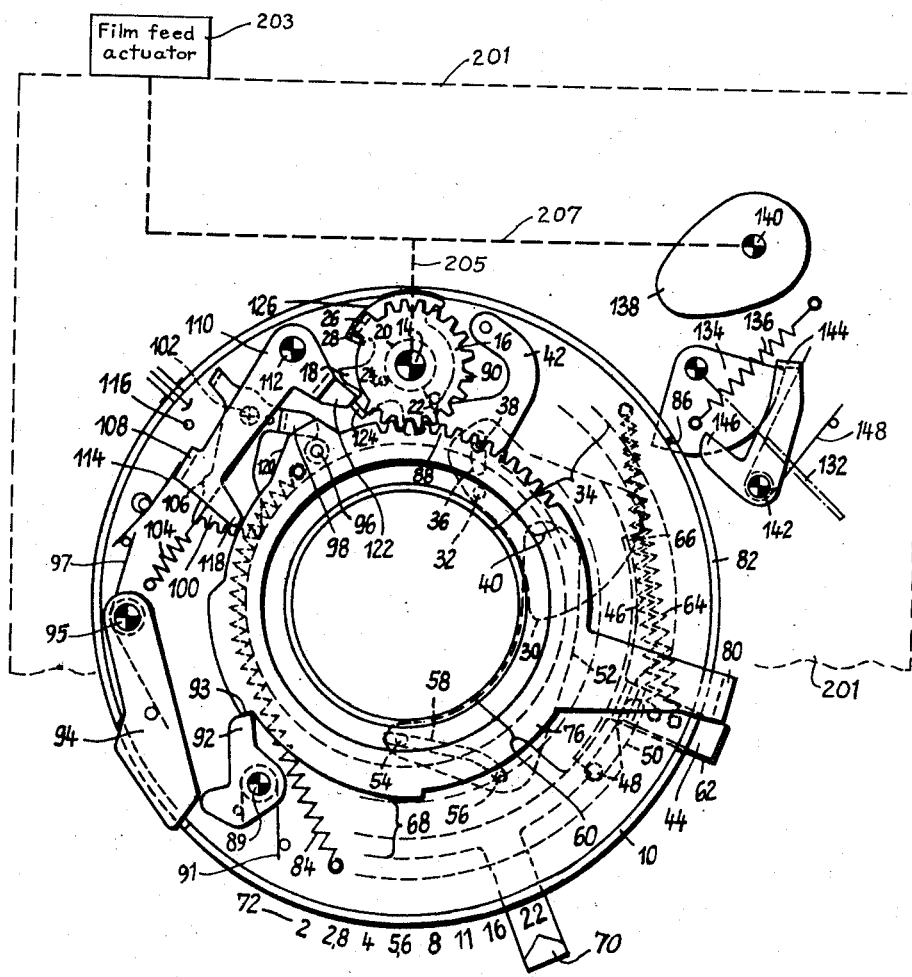
Fig. 3 is a view similar to Fig. 1, showing the shutter parts in set or tensioned position with both the shutter blades and the diaphragm leaves wide open to admit light for focusing, and showing the mirror in the reflecting position for focusing.

Fixed to the shaft 14 near its forward end is a cocking or tensioning disk 16 having gear teeth 90 extending around the major part of its periphery and a downturned ear 26 at one point where there are no gear teeth. Rotatable on the shaft 14, below or behind this tensioning disk 16, is the main driving member or master member 18 of the shutter. The main driving spring or master spring 20 of the shutter is wound around the shaft 14, and has one end 22 engaged with a fixed pin on the shutter casing, while the other end 24 is engaged with a pin on the master member 18, the spring acting in a direction to tend to turn the master member clockwise on the shaft 14 when viewed from the front of the shutter, as in Figs. 1 and 3–5. When the shaft 14 and the tensioning disk 16 are turned in a counterclockwise direction, the lug 26 on the tensioning disk engages a lug 28 on the master member 18 and turns the master member in a counterclockwise direction to tension the driving spring 20, the master member then being held in fully tensioned position by means of a latch part 122 engaging a latching lug 124 on the master member as seen in Fig. 3 and as further explained below.

Movable shutter blades 30, located behind the partition plate 13 as above mentioned, are mounted to swing between open and closed positions. Only one shutter blade is shown in the drawings, for the sake of clarity, although it will be understood that, as usual, any desired number of blades may be employed, five being a convenient number. Each blade is provided with a pivot 32, and the pivots of all the shutter blades engage in suitable openings in a ring member 34, the outer periphery of which is supported for rotation within the shutter casing, just behind the partition plate 13. Each blade also has one guide slot 36, the respective slots in the respective blades being engaged by respective control pins or driving pins 38 mounted on the shutter blade ring or driving ring 40 which is rotatable within the casing about the optical axis as a center.

This blade ring 40 has an arm 42 extending a substantial distance in a radial direction, within the casing, and thence extending somewhat in a circumferential direction, as seen in the drawings. This arm 42 is the driving arm of the blade ring, and cooperates in known manner with suitable driving parts (not shown) on the main driving member or master member 18, in such manner (well understood by those skilled in the art) that when the master member performs its running-down movement in a clockwise direction from its fully tensioned position, it will move the driving arm 42 of the blade ring first in a counterclockwise direction to shift all of the blade driving pins 38 to open the blades 30, and then in a clockwise direction to shift the driving pins 38 back to close the blades, by rocking them on their pivots 32, thus making an exposure. The construction of the parts for driving the blade ring from the master member may take the form shown, for example, in the copending U.S. patent application of Franz Singer, Serial No. 306,562, filed August 27, 1952 (now Patent 2,785,612, granted March 19, 1957), and assigned to the same assignee as the present application.

If it is desired to open the shutter blades, not for an exposure but for observation purposes (e.g., for focusing) this may be done by turning the ring 34 which receives the shutter blade pivots 32, while keeping the blade ring 40 stationary. Rotation of the ring 34 is obtained by moving a radial arm 44 formed on the member 34, which arm 44 extends out to the exterior of the shutter casing through a slot 45 formed in the rear wall, as seen especially in Fig. 2. A coil tension spring 46 fastened at one end to the arm 44 and at the other end to a fixed pin on the casing, constantly tends to turn the arm 44 and ring 34 in a counterclockwise direction to keep the blades 30 closed so far as the ring 34 is concerned, although this does not prevent them from opening when the ring 40 is moved. The range of rotary movement of the ring 34 and arm 44 is limited by a pin 48 on the ring, engaging with one end or the other of an arcuate slot 50 formed in the shutter casing 10.

The shutter is also provided, as usual, with a plurality of diaphragm leaves or blades in any desired number, only one being shown at 52, for the sake of clarity. The diaphragm leaves are mounted to the rear of the shutter blades 30, as seen in Fig. 2. Each leaf 52 is supported for rotation about its main pivot 54 and also carries a second pivot 56 engaging in a control slot 58 in the diaphragm setting ring 60, there being, of course, a separate pivot 56 and control slot 58 for each of the several diaphragm leaves 52. The ring 60 is rotatably mounted in the shutter casing, and carries an operating arm 62 which extends out to the exterior of the casing through the above mentioned slot 45, and thence extends radially in a plane just to the rear of the radially extending part of the arm 44, as seen in Fig. 2. By turning the ring 60 by means of the arm 62, the diaphragm leaves 52 may be adjusted to the desired aperture of $f$ stop setting.

A coil tension spring 64 is fastened at one end to the arm 62, and at the other end to a fixed pin on the casing, and acts in a direction to tend to turn the arm 62 and the ring 60 counterclockwise when viewed from the front of the shutter, which direction of movement tends to close the diaphragm leaves down to the smallest aperture or stop. A lug or shoulder 66 on the aperture selector ring 68 serves as an abutment limiting the counterclockwise movement of the arm 62, thus determining the extent to which the spring 64 can close down the diaphragm leaves. This ring 68 is externally mounted for rotation at the rear of the shutter, and carries an indicator arm or pointer 70 which extends radially outwardly to a position beyond the maximum radius of the shutter casing, as seen in dotted lines in Fig. 2, thence forwardly, and thence radially inwardly again to a pointer end which cooperates with an aperture or $f$ stop scale 72 conveniently marked on the front cover plate 74 of the shutter, but shown for reference in Figs. 1 and 3 as being adjacent the periphery of the shutter, since the cover plate 74 itself is not shown in these figures. The aperture selector ring 68 is provided with suitable click stops or other detent means offering substantial resistance to rotary movement, so that the selector ring may be turned by hand when desired, by overcoming the resistance of the detent means, but when set in any selected position, it offers greater resistance than can be overcome by the spring 64. Thus when the arm 62 is displaced in a clockwise direction to open the diaphragm leaves, and is then released, the spring 64 will bring the arm 62 back in a counterclockwise direction only until it engages the abutment 66 on the ring 68, in whatever position the ring 68 may have been previously set, and the spring 64 will not cause any rotary displacement of the ring 68 from its manually set position.

Mounted within the shutter casing for rotation about the front lens tube 78 is a control ring 76 which carries a radial arm 80 extending out to the exterior of the casing through a slot 82, and thence bent rearwardly as seen in Fig. 2, so as to intersect the transverse planes of the radial external parts of the arms 44 and 62. A coil tension spring 84 fastened at one end to a fixed pin in the shutter casing and at the other end to a pin on the control ring 76, constantly tends to turn this control ring in a counterclockwise direction until the arm 80 thereof comes into contact with one end 86 of the slot 82, which end forms an abutment limiting the counterclockwise turning of the ring.

This control ring 76 has part of its periphery provided with teeth 88 which mesh with the complementary teeth 90 on the tensioning disk 16. Thus, when the tensioning shaft or cocking shaft 14 is turned in a counterclockwise direction to tension the shutter ready for an exposure, the counterclockwise rotation of the disk 16, acting through the teeth 90 thereon and the teeth 88 on the control ring 76, will turn the control ring in a clockwise direction. Or, conversely, if manual force is applied directly to the external part of the arm 80 of the control ring 76 so as to turn the control ring in a clockwise direction, the teeth 88 and 90 will serve to turn the tensioning disk 16 and shaft 14 in a counterclockwise direction. The clockwise movement of the control ring 76 (whether produced by turning force applied to the shaft 14, or force applied to the arm 80) is continued until the end of a latch dog or pawl 92, mounted on a pivot 89 and urged clockwise by a spring 91, snaps behind a latching shoulder 93 on the control ring 76, as seen in Fig. 3. At the same time, another latching element 122 snaps behind the latching lug 124 on the master member, as will be further described below. During the clockwise movement of the control ring 76 to its latched position, the arm 80 thereof engages successively with the arms 62 and 44 on the respective rings 60 and 34, turning both of these rings in a clockwise direction against the force of their respective springs 64 and 46, thereby fully opening both the shutter blades and the diaphragm leaves to maximum extent, to the positions shown in Fig. 3. The control ring 76 is released from this latched position by pressing radially inwardly on the protruding and manually accessible end of the shutter trigger or release member 94, pivoted in the casing at 95 and provided with a spring 97 tending to swing the release member outwardly. When swung inwardly, one end of the release member engages the tail of the pawl 92 to turn the pawl to release it from the latching shoulder 93.

The control ring 76 carries a pin 96 which, during the above mentioned clockwise rotation of the ring, is adapted to engage the nose 98 of a toothed segment 100 pivoted on the pin 102 within the shutter casing and acted upon by a spring 104 constantly tending to rotate the segment 100 in a clockwise direction. The gear teeth on the segment 100 are in engagement with a clockwork escapement mechanism of suitable known construction, serving to retard the running-down motion of the segment in a clockwise direction. The movement of the segment may perform alternative functions. For example, it may close an electric switch in predetermined or synchronized timed relationship to the opening of the shutter blades. Neither the details of the escapement mechanism nor the details of the synchronizer switch operation are important to the present invention, so are not illustrated in the present drawings, but the gear segment may function in a general way similar to the gear segment 124 in applicant's co-pending U.S. patent application filed July 9, 1952, Serial No. 297,901, now abandoned.

Figure 1:
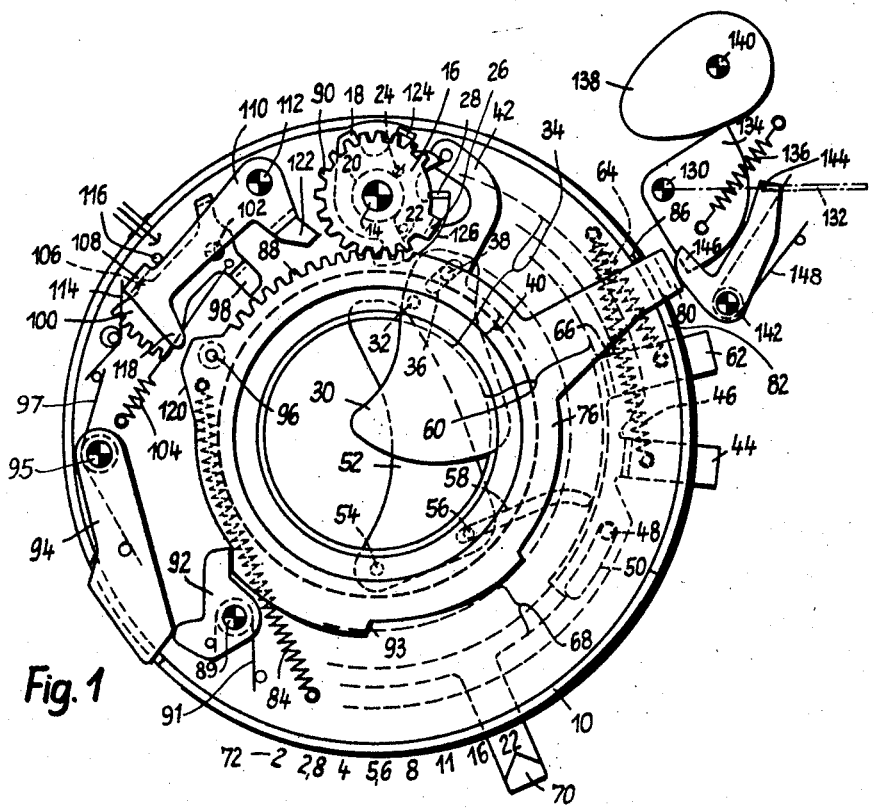
Fig. 1 is a front view of a shutter and associated camera parts, including the mirror operating mechanism, the cover plate of the shutter and various other parts being omitted for the sake of simplicity and clarity, the shutter and mirror parts being illustrated in normal run-down or rest position.

A cam or projection 106 on one edge of the gear segment engages an angular lug 108 on a locking lever 110 which is pivoted to swing on the pivot 112 in the shutter casing, and which is urged in a counterclockwise direction on its pivot by a spring 114, which tends to keep the lug 108 in engagement with the part 106 of the gear segment. The spring 104 is, however, stronger than the spring 114, so that unless other force is applied, the spring 104 will swing both the segment and 100 and the locking lever 110 in a clockwise direction on their respective pivots, to the extreme position determined by the stop pin or abutment 116, as seen in Fig. 1.

The locking lever 110 is further provided with a projection or nose 118 which cooperates with an inclined cam surface 120 formed on the control ring 76. The lever also has a locking tooth or pawl portion 122 which is adapted to engage and latch the lug 124 of the main driving member or master member 18 to retain the master member in fully tensioned or wound condition as shown in Fig. 3, at the completion of the tensioning operation, as above mentioned.

The master member 18 also carries a cam portion 126 which cooperates with a suitable gear train escapement mechanism (not shown) accommodated within the shutter casing 10, to retard the running-down motion of the master member, in order to time the shutter for various different adjustable lengths of exposure. Such gear train escapement retarding mechanisms are well known in the art, and the details are not important for purposes of the present invention. The construction may, however, be similar in a general way to that disclosed in the above mentioned Singer Patent 2,785,612.

The retarding action of the escapement mechanism acting on the master member, may be adjusted and controlled in suitable known manner, as by turning the shutter speed adjusting ring or selector ring 128 (see Fig. 2) rotatably mounted at the front of the shutter and corresponding in a general way to the speed adjusting ring 63 in the Deckel and Geiger U.S. Patent 1,687,123, issued October 9, 1928. While the shutter of the present application is quite different in many respects from the shutter shown in said Deckel and Geiger patent, yet this patent does disclose how a rotatable speed control ring may serve to control the retarding effect produced by an escapement mechanism, and the same principles of control may be applied to the retarding escapement mechanism of the present shutter.

Referring now to the camera itself, certain parts of which are shown diagrammatically or schematically in Fig. 3, the camera comprises a main body indicated diagrammatically at 201, at the front of which body the shutter is secured, in position to admit light into the camera body when the shutter blades are open. As is usual in reflex cameras of the single lens type, a reflex mirror 132 is mounted within the camera body and is operatively connected to the shaft 130 to swing from an upper position, when a picture is to be taken, down to a lower oblique position to reflect light rays up to a focusing screen at the top of the camera body, in the usual manner.

In the present instance, the shaft 130 is mounted in the camera body in a position parallel to the optical axis of the shutter, which optical axis is located at the center of the shutter and extends in a direction perpendicular to the plane of the paper in Figs. 1 and 3–5. The mirror 132 is not actually mounted directly on this shaft 130, but is mounted on a transversely extending shaft at the upper part of the rear portion of the camera body, so that the mirror extends forwardly from this shaft, and also obliquely downwardly from it when the mirror is tilted to focusing position. However, for the sake of simplicity in Figs. 1, 3 and 4 of the present drawings, the mirror 132 is illustrated as being mounted directly on the shaft 130, it being understood that in actual practice the mirror shaft is operatively connected by gearing to the shaft 130, to turn therewith.

Fixed to the shaft 130 is a sector plate 134 lying in a plane near the shutter and in position to be engaged, under certain circumstances, by a bent-over ear or lug at the end of the arm 80 of the ring 76. A spring 136 connected at one end to the sector 134 and at the other end to a fixed pin on the camera body, tends constantly to swing the sector 134 and shaft 130 in a counterclockwise direction when viewed as in Figs. 1, 3, and 4, thereby tending to swing the mirror 132 up from the focusing position shown in Fig. 3 to the picture-taking position shown in Figs. 1 and 4.

Located in the same plane with the sector 134 is an actuating cam 138 fixed to a shaft 140 rotatably mounted in the camera body. The camera is provided with film winding or transport mechanism of known form, operated after each exposure by any suitable actuating means such as a crank or knob indicated diagrammatically in Fig. 3 at 203. The film feed actuator 203 is operatively connected by suitable shafts and gearing indicated diagrammatically at 205 to the shutter tensioning shaft 14, and by shafts and gearing indicated diagrammatically at 207 to the cam shaft 140. The connections are so formed that when the film feed actuator 203 is operated to transport the film after making an exposure, it causes one complete revolution in a counterclockwise direction of the shaft 140 and cam 138, and also a counterclockwise rotation of the shutter tensioning shaft 14 through whatever part of a revolution is necessary to tension the shutter completely.

On a stub shaft or pin 142 on the camera body there is a latching pawl having on one arm a bent ear or lug 144 adapted to engage over one corner of the sector 134 to latch the sector as shown in Fig. 3, the pawl having a second arm 146 lying in the path of movement of the ear or lug on the end of the arm 80 of the ring 76. A light spring 148 tends to turn the latch in a counterclockwise direction relative to the pivot 142.

The operation of the parts is as follows: Let it be assumed that the parts are in the run-down or rest position at the completion of an exposure, this position being shown in Fig. 1. The mirror 132 is in the picture-taking position rather than the focusing position, the shutter blades 30 are fully closed, and the diaphragm leaves 52 are stopped down to whatever size of aperture has been selected as determined by the setting of the diaphragm adjusting ring 68.

The operator now operates the film transport actuator 203, to feed a fresh frame of film into exposure position in the camera. Through the operative connection 207, this movement of the film feed actuator causes the shaft 140 to turn in a counterclockwise direction, and through the connection 205 it causes the shaft 14 to turn simultaneously in a counterclockwise direction.

Very early in the movement of the shaft 14, the gear 16 thereon moves the ring 76 to carry the arm 80 away from the sector 134, so that the cam 138, early in its movement, can force the sector 134 down against the tension of the spring 136, from the position shown in Fig. 1 to the position shown in Fig. 3, whereupon the ear 144 of the latching pawl engages over the corner of the sector 134 and latches the sector in its down position, so that it does not spring back upwardly even when the cam 138 continues its travel and passes out of contact with the sector.

As the arm 80 of the ring 76 continues its clockwise travel (caused by the counterclockwise rotation of the shaft 14) it engages first with the arm 62 of the diaphragm control ring 60, and causes the slots 58 therein to act on the pins 56 of the diaphragm leaves to open the diaphragm to maximum aperture. A little further along in the clockwise movement of the arm 80, it engages the arm 44 of the ring 34, to move this ring clockwise so as to move the pivot pins 32 of the shutter blades 30 to open all of the shutter blades fully, notwithstanding the fact that the regular operating pins 38 in the blade ring 40 remain stationary at this time. The parts are so proportioned and designed that the mirror 132 and its sector 134 have already been swung fully down to focusing position, before the blades 30 begin to open. Hence the light entering through the open shutter will be reflected to the focusing screen by the mirror 132, and will not reach the fresh supply of sensitized film which has been fed into exposure position.

As the control ring 76 approaches its extreme position in a clockwise direction, the pin 96 thereon engages the tail 98 on the gear segment 100 and swings this segment against the force of its spring 104, so that this segment no longer interferes with counterclockwise turning of the latching member 110. Therefore, when the control ring 76 reaches its fully actuated or tensioned position, the nose 122 on the latching member 110 snaps behind the latching lug 124 on the master member, under the influence of the spring 114. At the same instant that the master member becomes latched, the latching pawl 92 likewise snaps behind the latching shoulder 93 of the control ring 76, latching it in position, so that the parts are now in the positions shown in Fig. 3.

Because the shutter blades and the diaphragm leaves are fully open, an adequate amount of light enters the camera body, is reflected upwardly by the mirror 132, and forms a clear image on the focusing screen. When the operator is ready to make the actual exposure, he releases the shutter by means of the shutter trigger 94, either by direct manual contact therewith, or by operating a plunger or other body release which is mounted on the camera body and operatively connected to the trigger 94. This operation swings the latch 92 and releases it from the shoulder 93. Then, under the influence of the spring 84, the control ring 76 starts to swing backwardly in a counterclockwise direction toward its rest position, but the master member 18 still remains latched by the pawl 122.

During the first part of the return movement of the control ring 76, the arm 80 releases the arm 44 of the ring 34, so that the spring 46 may return the ring 34 to its normal rest position, thereby closing the shutter blades 30. At about this time or soon afterwards, the arm 80 on the control ring releases also the arm 62 of the ring 60, so that the latter is restored to rest position by its spring 64, thereby closing the diaphragm leaves down to whatever stop or aperture size has been previously selected by positioning the diaphragm control member 68, 70.

Figure 4:
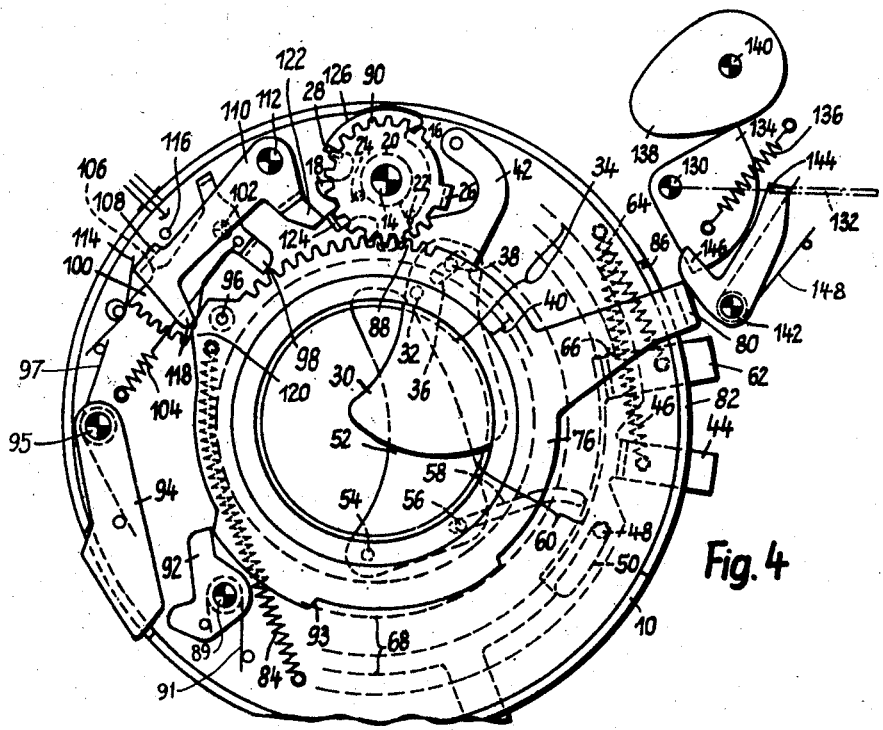
Fig. 4 is a similar view showing the parts in the position assumed shortly after the shutter is tripped for making an exposure, with the shutter blades closed preparatory to making the actual exposure, with the diaphragm leaves closed down to the pre-selected aperture size, and with the reflex mirror swung up to its ineffective or picture-taking position.

After the shutter blades have been fully closed and the diaphragm leaves have been restored to their preselected aperture size, the arm 80 reaches the position shown in Fig. 4, and hits the arm 146 of the latching pawl to swing this pawl clockwise on the pivot 142 against the action of the spring 148. At the same time, further progress of the arm 80 is temporarily prevented by the arcuate edge of the sector 134, which stands in the way of the arm 80. As soon as the arm has released the latch 144 from the corner of the sector 134, the spring 136 acts to swing the mirror 132 up from the position shown in Fig. 3 to the picture-taking position shown in Fig. 4. As the mirror reaches its picture-taking position, the lower corner of the sector 134 passes out of the way of the arm 80, so that the spring 84 may now turn the ring 76 further in a counterclockwise direction, from the position shown in Fig. 4 to the position shown in Fig. 5.

Figure 5:
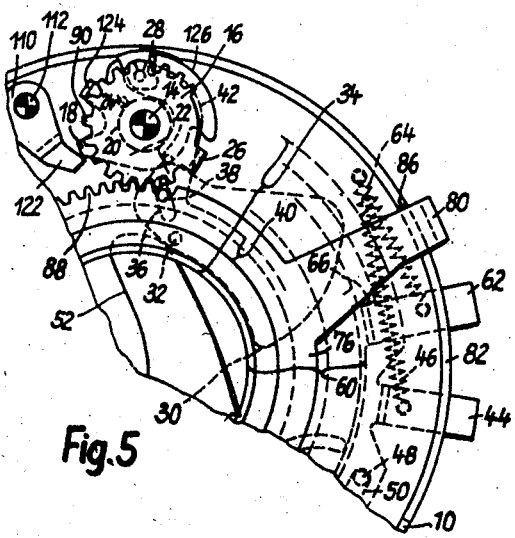
Fig. 5 is a fragmetary view of the shutter parts at a slightly later stage of operation, with the shutter blades now open for making the actual exposure.

In the position shown in Fig. 4, the pawl 122 has not quite released the latching lug 124 on the master member. However, as soon as the sector 134 releases the arm 80 so that the latter may swing a little further, the cam portion 120 on the control ring 76 moves the nose 118 far enough to release the pawl 122 from the latching lug 124, so that the master member may turn clockwise under the influence of the master spring 20, at a rate or speed controlled by the escapement retarding mechanism, to make the actual exposure. The master member acts on the blade ring 40 to turn the ring in a counterclockwise direction to open all of the shutter blades 30 as shown in Fig. 5, and then turns the blade ring 40 back in a clockwise direction, again closing the blades to normal or rest position as shown in Fig. 1.

Depending upon the exact position of the latch 146 with relation to the arm 80 and the sector 134, the mirror 132 and sector 134 may be adjusted to swing out of the way fast enough so that the arm 80 is not actually stopped in its travel by contact with the sector 134. But in any event, whether the arm is actually held stationary for a moment by contact with the arcuate edge of the sector 134, or whether the sector is already out of the way when the arm reaches this location, the sector does serve as a precautionary guard to make sure that the shutter blades cannot be opened until the mirror 132 has swung up fully to its picture-taking position.

In Figs. 6–8 there is shown another embodiment of the invention, in which the mirror control mechanism cooperates with some other running-down part of the shutter, rather than with the arm 80 of the control ring 76. The mirror control sector is here shown at 134a and corresponds in general to the sector 134 in the previous embodiment, except that it swings in the opposite direction, turning counterclockwise against the force of the spring 136a when the mirror turns from picture-taking position to focusing position, and turning clockwise under the influence of the spring when the mirror swings from focusing position to picture-taking position.

The latching pawl 142a corresponds in general to the latching pawl in the previous embodiment, and has one lug 144a cooperating with a corner of the sector 134a to latch the mirror in focusing position as shown in Fig. 7, and also another arm 146a lying in the path of movement of an arm 180 on a control member 176 which is fixed to the shutter tensioning shaft 14 to turn therewith. This member 176 also has a second arm 182 to cooperate with the sector 134a as seen in Fig. 8.

The rest or run-down position is shown in Fig. 6. When the film feeding or film winding member is actuated, the sector 134a is swung down from the position shown in Fig. 6 to the position shown in Fig. 7, just as in the previous embodiment, and becomes latched in this position by the latching portion 144a on the pawl 142a. When an exposure is to be made, the counterclockwise swinging of the arm 80 and control ring 76 is accompanied by clockwise swinging of the shaft 14 and member 176 (due to the gearing connection 88, 90) and, after the shutter blades have been closed, the arm 180 engages the latching pawl arm 146a to release the latch so that the spring 136a may turn the sector 134a to shift the mirror to picture-taking position. Until the mirror has fully reached its picture-taking position, the arcuate edge of the sector 134a lies in the way of the arm 182 and prevents the shaft 14 from continuing its movement. When the mirror reaches picture-taking position, the lower corner of the sector 134a passes beyond the arm 182, and the shaft 14 may continue its movement, thereby allowing the control ring 76 to move far enough to release the pawl 122 from the master member latching lug, permitting the master member to start its running-down or exposure-making movement.

It will be noted that in both embodiments, there is a direct inter-action between the camera shutter mechanism and the mirror positioning mechanism, this direct inter-action having few parts so that the mechanism is positive in action and not likely to get out of order.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A reflex camera of the type including a mirror shiftable between a picture taking position and a focusing position, a mirror spring tending to move said mirror from focusing position to picture taking position, a mirror latch for holding said mirror in focusing position against the force of said mirror spring, a shutter unit including an optical axis and movable blades shiftable between closed and open positions respectively to obstruct and to permit passage of light along said optical axis, a master member movable between a tensioned position and a rest position and operatively connected to said blades to open and close them upon movement of said master member from tensioned position to rest position, a master spring tending to move said master member from tensioned position to rest position, and a master member latch for holding said master member in tensioned position against the force of said master member spring, characterized by the provision of a control ring mounted on said shutter unit for rotation substantially about said optical axis as a center of rotation, between a tensioned position and a rest position, a control ring spring tending to move said control ring from tensioned position to rest position, a manually releasable latch for holding said control ring in tensioned position against the force of said control ring spring, means operated by movement of said control ring from tensioned position toward rest position, upon release of said manually releasable latch, for releasing said mirror latch so that said mirror spring may move said mirror from focusing position to picture taking position, means connected to said mirror to move therewith for blocking further movement of said control ring, upon release of said mirror latch, until said mirror reaches its picture taking position, and means operated by further movement of said control ring toward rest position, after said mirror reaches its picture taking position, for releasing said master member latch so that said master spring may move said master member to its rest position to open and close said blades to make an exposure.

2. A reflex camera of the type including a mirror shiftable between a picture taking position and a focusing position, a mirror spring tending to move said mirror from focusing position to picture taking position, a mirror latch for holding said mirror in focusing position against the force of said mirror spring, a shutter unit including an optical axis and movable blades shiftable between closed and open positions respectively to obstruct and to permit passage of light along said optical axis, a master member movable between a tensioned position and a rest position and operatively connected to said blades to open and close them upon movement of said master member from tensioned position to rest position, a master spring tending to move said master member from tensioned position to rest position, and a master member latch for holding said master member in tensioned position against the force of said master member spring, characterized by the provision of a control ring mounted on said shutter unit for rotation substantially about said optical axis as a center of rotation, between a tensioned position and a rest position, a control ring spring tending to move said control ring from tensioned position to rest position, a manually releasable latch for holding said control ring in tensioned position against the force of said control ring spring, means for concomitantly moving said mirror to focusing position and moving said master member to its tensioned position and moving said control ring to its tensioned position, means operated by movement of said control ring from tensioned position toward rest position, upon release of said manually releasable latch, for releasing said mirror latch so that said mirror spring may move said mirror from focusing position to picture taking position, means connected to said mirror to move therewith for blocking further movement of said control ring, upon release of said mirror latch, until said mirror reaches its picture taking position, and means operated by further movement of said control ring toward rest position, after said mirror reaches its picture taking position, for releasing said master member latch so that said master spring may move said master member to its rest position to open and close said blades to make an exposure.

References Cited in the file of this patent

UNITED STATES PATENTS

| | | |
|---|---|---|
| 2,348,510 | Aiken | May 9, 1944 |
| 2,356,880 | Pignone | Aug. 29, 1944 |
| 2,503,777 | Stoiber | Apr. 11, 1950 |
| 2,552,275 | Harvey | May 8, 1951 |